(12) United States Patent
Yokomaku et al.

(10) Patent No.: US 6,427,943 B2
(45) Date of Patent: Aug. 6, 2002

(54) STRATOSPHERIC AIRSHIP

(75) Inventors: Yoshio Yokomaku; Keiji Komatsu; Masaaki Sano; Junichi Kimura, all of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/765,764

(22) Filed: Jan. 18, 2001

(30) Foreign Application Priority Data

Jan. 19, 2000 (JP) ........................................ 2000-010984

(51) Int. Cl.$^7$ ............................... B64B 1/58; B64B 1/04
(52) U.S. Cl. ........................ 244/30; 244/127; 244/128
(58) Field of Search ......................... 244/24, 30, 31, 244/127, 128

(56) References Cited

U.S. PATENT DOCUMENTS

| | | | | |
|---|---|---|---|---|
| 1,682,405 A | * | 8/1928 | Naatz | 244/30 |
| 2,492,800 A | * | 12/1949 | Isom | 244/31 |
| 3,706,433 A | * | 12/1972 | Sonstegaard | 244/128 |
| 4,711,416 A | * | 12/1987 | Regipa | 244/31 |
| 5,538,203 A | * | 7/1996 | Mellady | 244/30 X |

FOREIGN PATENT DOCUMENTS

JP    5470597    6/1979

* cited by examiner

Primary Examiner—Robert P. Swiatek
(74) Attorney, Agent, or Firm—Martin A. Farber (57) ABSTRACT

A stratospheric airship capable of substantially and smoothly varying the volume of a buoyant gas is provided so as to allow the airship to stably ascend into the stratosphere and keep a station therein. A stratospheric airship includes a gas envelope defined by a ship hull, the gas envelope being divided by a diaphragm into a buoyant gas compartment containing a buoyant gas and an air compartment containing air, the stratospheric airship being allowed to ascend by varying the volume ratio between the buoyant gas and the air, wherein the periphery of the diaphragm is coupled to the ship hull generally at the midpoint along the vertical dimension thereof, and a central portion of the diaphragm is coupled to a suspension chord whose upper and lower ends are coupled respectively to the upper and lower surfaces of the ship hull. The sloshing phenomenon of the diaphragm is suppressed, whereby the change in the shape thereof is balanced, and thus there is no asymmetric distribution of the buoyant gas. Therefore, it is possible to smoothly change the volume ratio between the buoyant gas and the air in the air compartment, thereby allowing the stratospheric airship to stably ascend into the stratosphere and keep a station therein.

8 Claims, 12 Drawing Sheets

PRIOR ART

FIG.10

PRIOR ART

PRIOR ART

STRATOSPHERIC AIRSHIP

BACKGROUND OF THE INVENTION

The present invention relates to an airship, and more particularly to a stratospheric airship having a gas envelope which is divided by a diaphragm into a buoyant gas compartment containing a buoyant gas therein and an air compartment containing air therein.

Airships are typically used at low altitudes (on the order of kilometer or less) where there is a relatively small change in atmospheric pressure for the purposes of advertisement, relay broadcasting of events, monitoring, security guarding, transportation, sightseeing, etc. For airships used at such low altitudes, the flight altitude control is relatively easy because the flight altitude does not have to be changed over a wide range. Specifically, for such an airship, the volume of the gas envelope is determined so that it can withstand flight at the maximum altitude. After takeoff, the airship is allowed to ascend by throwing ballasts away. After the airship reaches the maximum altitude, the buoyant gas is partially exchanged to the air so as to allow the airship to descend.

In order for an airship to ascend to a high altitude, called the "stratosphere" (e.g., 17 to 22 Km in altitude), where the atmosphere density is diluted to about $1/14$ to $1/15$ of that in the vicinity of the sea level, it is indispensable to provide the airship with a mechanism capable of substantially varying the volume of the buoyant gas for producing a buoyancy such as a helium gas by 14 to 15 folds.

A type of a volume varying mechanism is disclosed in, for example, Japanese Patent Laid-Open Publication No. Sho 54-70597. According to the disclosure, an airship is allowed to descend by winding up the hull of the gas envelope (where the buoyant gas is contained) by means of a roller or by retracting the hull of the gas envelope while squeezing the gas envelope by means of a plurality of rollers opposing one another, so as to reduce the volume of the gas envelope and increase the internal pressure thereof, thereby reducing the static buoyancy. The airship is allowed to ascend by drawing out the hull so as to increase the volume of the gas envelope and reduce the internal pressure, thereby increasing the static buoyancy.

With such a mechanism, however, since the volume of the gas envelope is varied to control the altitude of the airship, the outer shape of the airship changes substantially. This also substantially changes the aerodynamic characteristics of the airship, thereby preventing the airship from ascending with a stable attitude.

Figure 9:
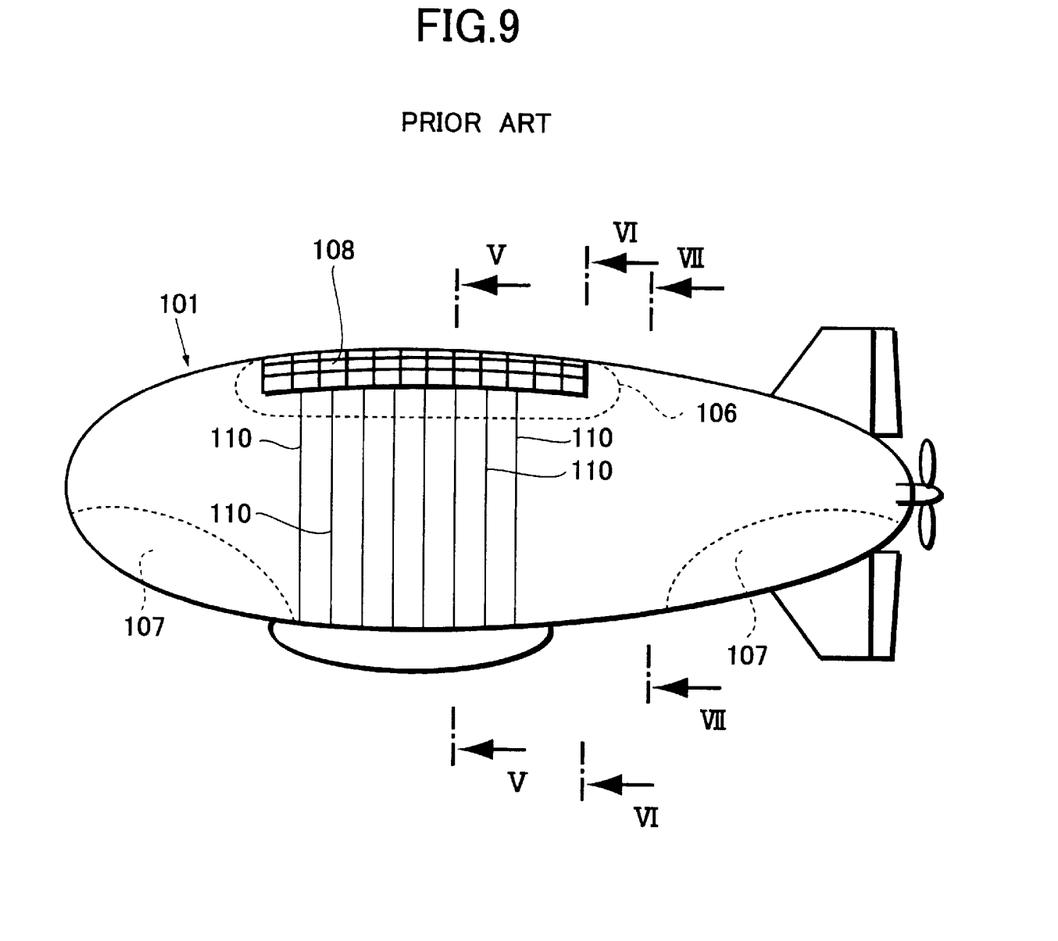
FIG. 9 is a side view schematically illustrating a conventional airship.
Figure 10:
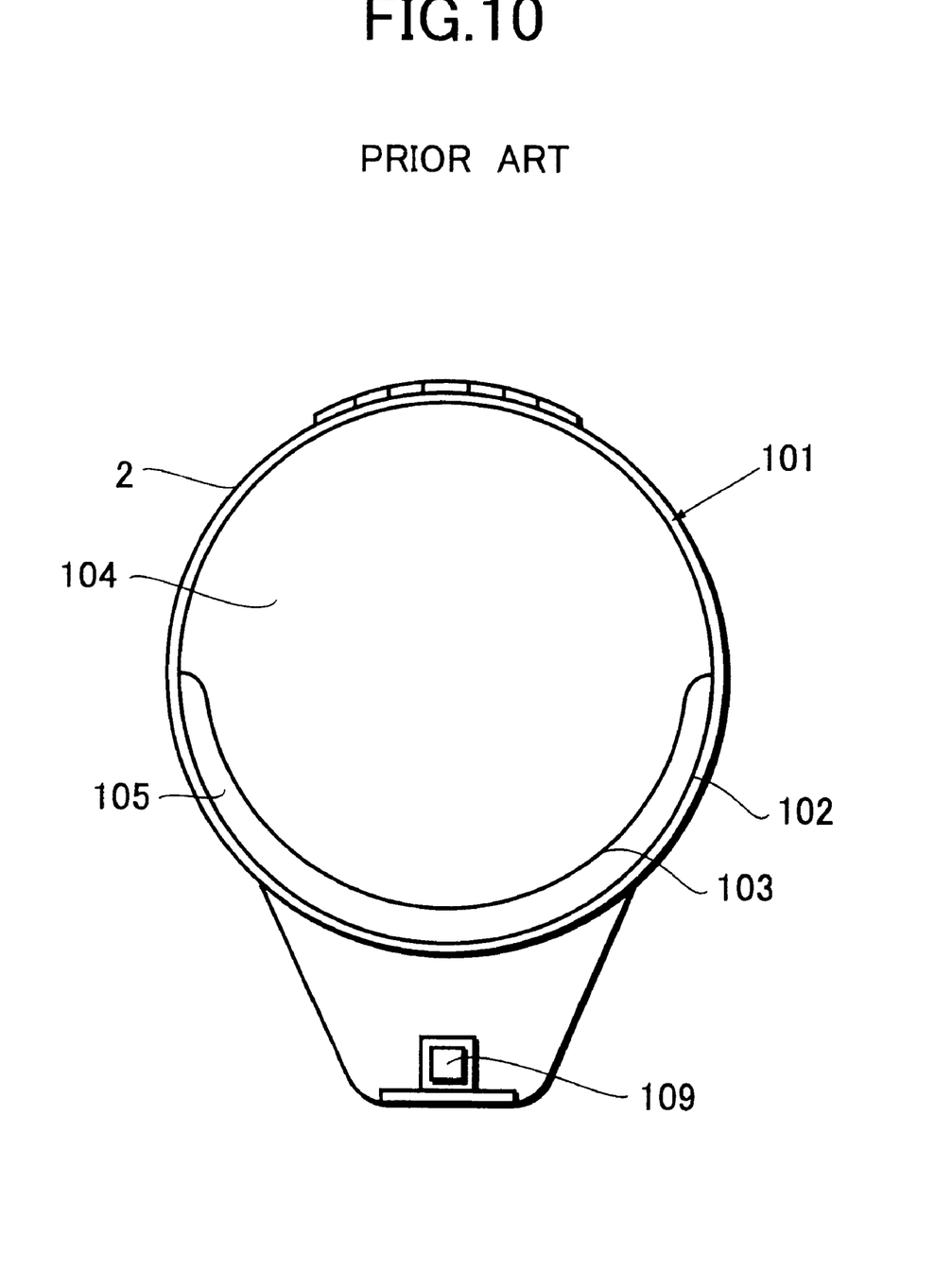
FIG. 10 is a cross-sectional view taken along line V—V in FIG. 9.
Figure 11:
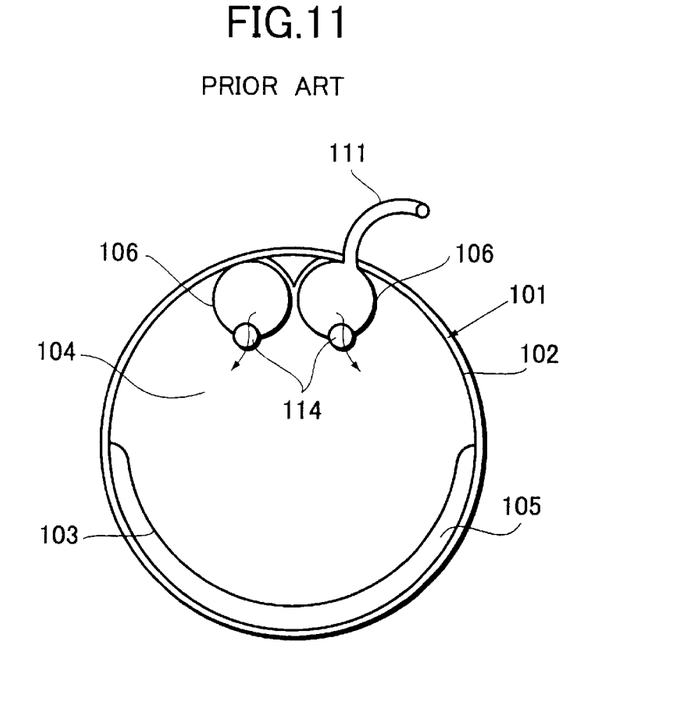
FIG. 11 is a cross-sectional view taken along line VI—VI in FIG. 9.
Figure 12:
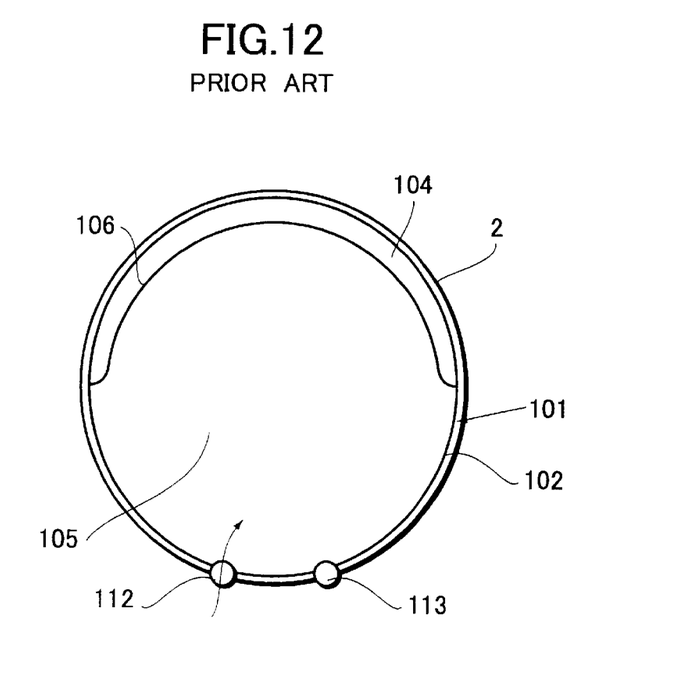
FIG. 12 is a cross-sectional view taken along line VII—VII in FIG. 9.

FIG. 9 is a schematic side view illustrating another airship in the prior art which addresses this problem. FIG. 10, FIG. 11 and FIG. 12 are cross-sectional views illustrating the same taken along line V—V, line VI—VI and line VII—VII in FIG. 9, respectively. Referring to FIG. 10, the airship has a gas envelope 101 defined by a balloon-shaped ship hull 102, and the gas envelope 101 is divided by a diaphragm 103, which acts as a diaphragm, into a buoyant gas compartment 104 containing a buoyant gas therein and an air compartment 105 containing air therein.

Referring to FIG. 11, a thin film buoyant gas tank 106 is provided in an upper portion of the buoyant gas compartment 104. Referring to FIG. 9, ballonets 107 are provided in a front and a rear portion of the air compartment 105 for maintaining the shape of the ship hull 102, i.e., the shape of the gas envelope 101, and for keeping the balance of the airship. Moreover, a solar battery module 108 is provided on the upper surface of the gas envelope 101, and a load 109 including equipment, a storage battery, a fuel cell, mission payload equipment, etc., is suspended from the bottom of the gas envelope 101. The solar battery module 108 and the storage battery, etc., are connected to each other via power cables 110 provided therebetween along the outer surface of the gas envelope 101.

Referring to FIG. 11 and FIG. 12, while the airship is still on the ground before takeoff, a buoyant gas, e.g., a helium gas, is introduced via a buoyant gas inlet 111 into the thin film buoyant gas tank 106, and the valve of the buoyant gas inlet ill is closed. Then, the ambient air is introduced via an air blower 112 into the air compartment 105 so as to pressurize the air compartment 105 to maintain the shape of the ship hull 102. At this time, an air vent valve 113 of the air compartment 105 is closed, and the diaphragm 103 is pushed up, whereby the thin film buoyant gas tank 106 and the buoyant gas supplied from the thin film buoyant gas tank 106 into the buoyant gas compartment 104 are pressurized, as illustrated in FIG. 12.

The airship starts ascending by an excessive buoyancy which is equal to the buoyancy provided by the buoyant gas in the buoyant gas compartment 104 and the thin film buoyant gas tank 106 minus the total weight of the airship including the equipment. As the airship ascends, the atmospheric pressure gradually decreases. Along with the decrease in the atmospheric pressure, the difference between the internal pressure of the gas envelope 101 and the atmospheric pressure gradually increases. In order to keep the pressure difference within a predetermined limit, the air vent valve 113 is opened so as to discharge the air from the air compartment 105 and to reduce and adjust the volume of air therein. The adjustment of the volume of air causes a difference between the pressure in the thin film buoyant gas tank 106 and that in the buoyant gas compartment 104. In order to keep the pressure difference at or below a predetermined pressure, a buoyant gas bent valve 114 is opened so as to transfer the buoyant gas from the thin film buoyant gas tank 106 into the buoyant gas compartment 104.

The buoyant gas transferred into the buoyant gas compartment 104 expands, thereby ensuring a sufficient excessive buoyancy for the airship to continue to ascend, and compensates for the reduction in the volume of air due to the discharge of air, thereby constantly maintaining the volume within the ship hull 102 and thus substantially constantly maintaining the outer shape of the gas envelope 101.

Figure 13:
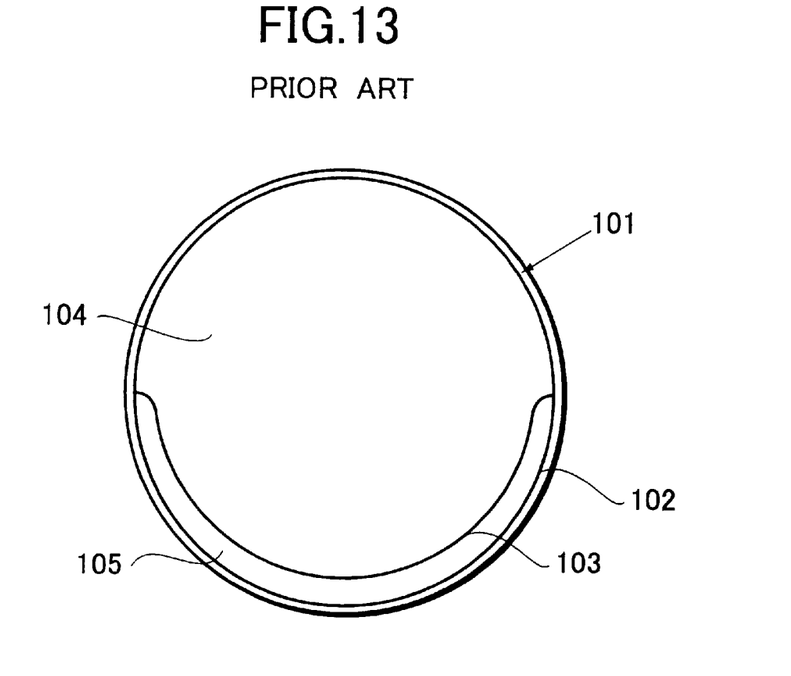
FIG. 13 is a cross-sectional view illustrating the inside of a gas envelope of the airship while the airship is keeping a station in the stratosphere.

After the airship has ascended into the stratosphere, the airship keeps a station in the air, with the gas envelope 101 being in a state as illustrated in FIG. 13. The volume of air in the air compartment 105 has been substantially reduced, and the diaphragm 103 has been pushed down by the expanded buoyant gas in the buoyant gas compartment 104 while the airship keeps a station in the stratosphere.

With the conventional airship as described above, the difference between the internal pressure of the gas envelope 101 and the atmospheric pressure which is caused by the atmospheric pressure decreasing along with the ascent of the airship is accommodated by reducing and adjusting the volume of air in the air compartment 105 so as to allow the buoyant gas to expand, thereby ensuring a sufficient excessive buoyancy. Moreover, the reduced volume of air is compensated for by the increased volume of the buoyant gas, thereby constantly maintaining the volume of the gas envelope 101. Thus, the outer shape of the gas envelope 101, i.e., the outer shape of the airship is substantially constantly maintained.

Figure 14:
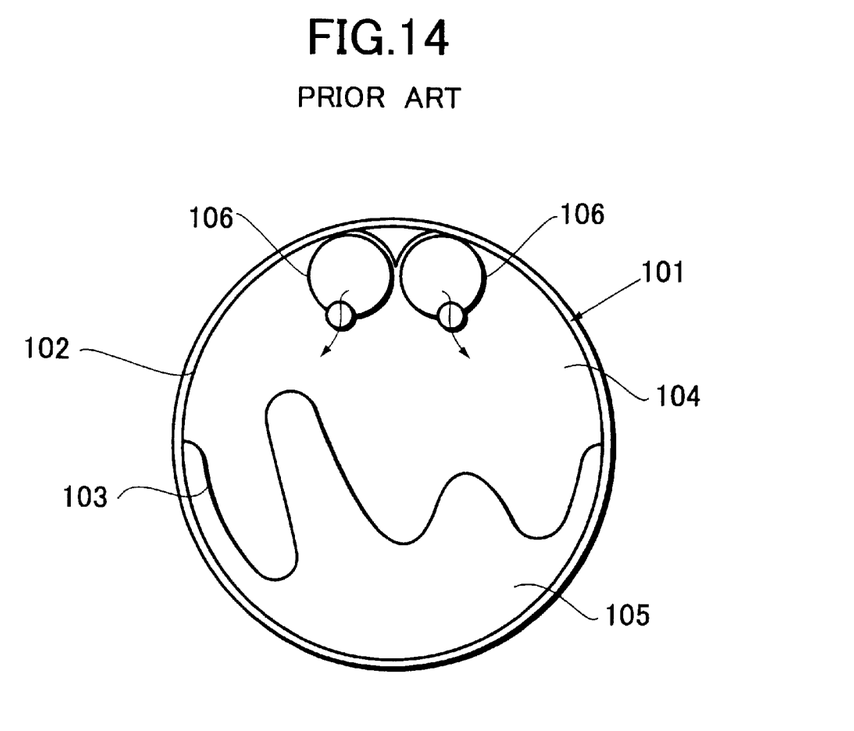
FIG. 14 is a cross-sectional view illustrating the inside of a gas envelope of the airship while the airship is ascending.

However, the diaphragm 103 for partitioning the buoyant gas compartment 104 and the air compartment 105 from each other is a very large sheet of film which is coupled along its periphery to the ship hull 102. Therefore, it is difficult for the diaphragm 103 to smoothly change its shape to closely follow the increase in the volume of the buoyant gas occurring along with the decrease in the volume of air in the air compartment 105. For example, as illustrated in FIG. 14, the diaphragm 103 may experience "sloshing" (i.e., a phenomenon in which the diaphragm 103 takes a wavy shape), thereby causing an asymmetric distribution of the buoyant gas in the gas envelope 101. The asymmetric distribution of the buoyant gas may disturb the balance of the buoyancy, thereby preventing the airship from stably ascending into the stratosphere. As a result, the size of the diaphragm 103 is limited, thereby also limiting the range over which the ratio between the volume of the buoyant gas and the volume of air can be varied.

Figure 15:
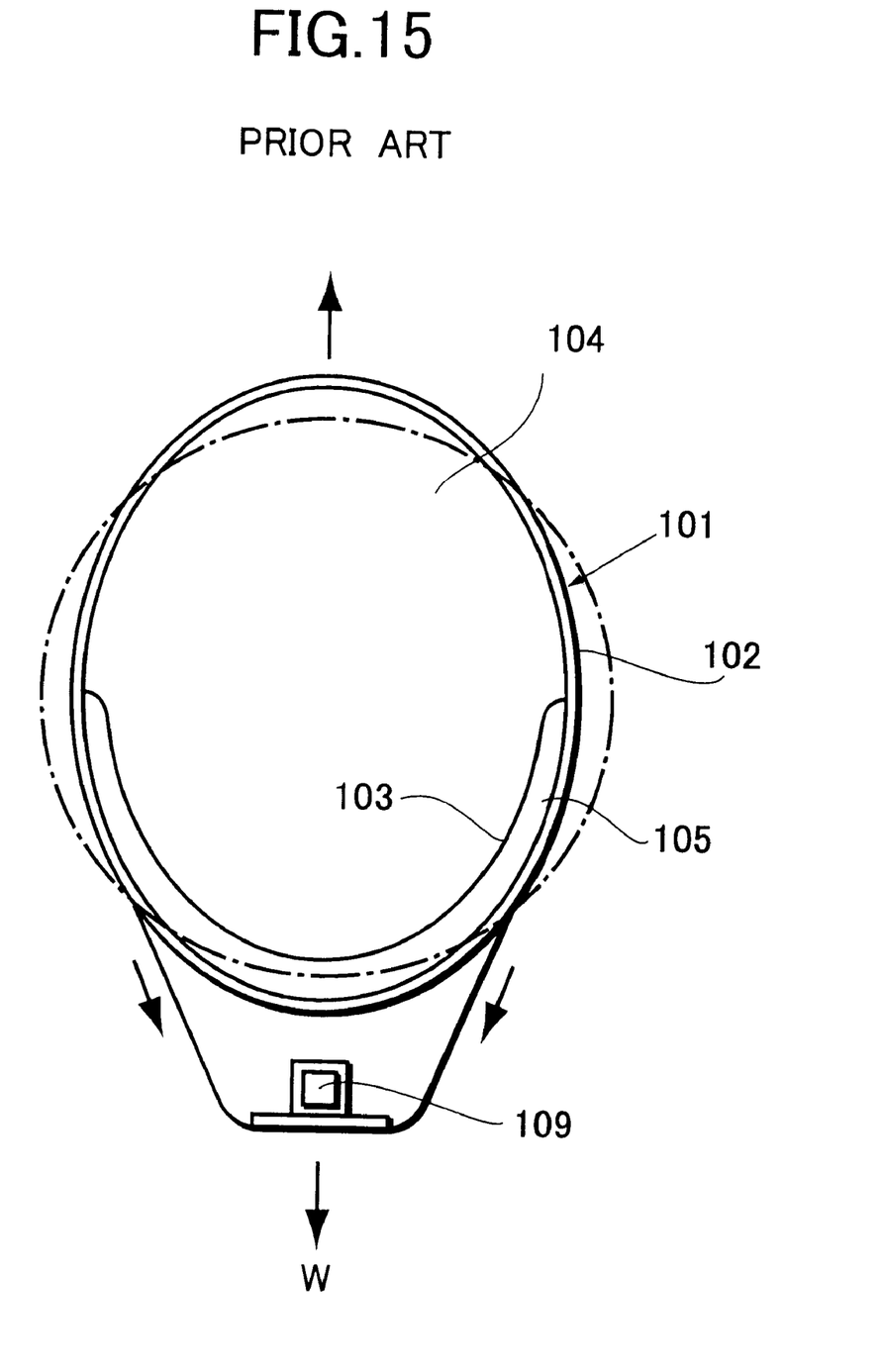
FIG. 15 is a cross-sectional view illustrating the action of the load weight.

Moreover, since the load 109 is suspended from the bottom of the gas envelope 101, a load weight W directly acts upon lower side faces of the ship hull 102. As a result, as illustrated in FIG. 15, the gas envelope 101 is deformed from the cross-sectional shape as illustrated in a one-dot chain line to a generally elliptical cross-sectional shape, thus deforming the outer shape of the gas envelope 101, thereby causing an asymmetric distribution of the buoyant gas in the buoyant gas compartment 104. The asymmetric distribution of the buoyant gas disturbs the balance of the buoyancy, which may reduce the aerodynamic stability, thereby preventing the airship from stably ascending. Moreover, the suspension of the load 109 requires a reinforcing member such as a reinforcing doubler for ensuring a sufficient strength in the lower side faces of the ship hull 102 upon which the load weight W acts, thereby causing an increase in the total weight of the airship.

Furthermore, the power cables 110 connecting the solar battery module 108 and the storage battery to each other are provided exposed along the outer surface of the gas envelope 101. Therefore, the power cable is long, thereby increasing the possible power loss therealong and the total weight of the airship. Moreover, since the power cables 110 are exposed, they may create an adverse aerodynamic drag.

SUMMARY OF THE INVENTION

Thus, the present invention has been made in view of these problems in the prior art, and an object of the present invention is to provide a stratospheric airship capable of substantially and smoothly varying the volume of a buoyant gas so as to allow the airship to stably ascend into the stratosphere and keep a station therein.

In order to achieve the object of the present invention as described above, according to a first aspect of the invention there is provided a stratospheric airship, comprising a gas envelope defined by a ship hull, a flexible diaphragm for vertically dividing the gas envelope into a buoyant gas compartment containing a buoyant gas and an air compartment containing air, the diaphragm being coupled along a periphery of the diaphragm to the ship hull generally at a midpoint along a vertical dimension of the ship hull, and a diaphragm supporting member for coupling a central portion of the diaphragm to a central portion of the gas envelope generally at a midpoint along a vertical dimension of the gas envelope, wherein the stratospheric airship can be ascended by varying a volume ratio between the buoyant gas contained in the buoyant gas compartment and the air contained in the air compartment.

In the first aspect of the present invention, even if the shape of the diaphragm changes along with the change in the volume ratio between the air contained in the air compartment and the buoyant gas contained in the buoyant gas compartment, a central portion of the diaphragm is coupled to a diaphragm supporting member in a central portion of the gas envelope generally at the midpoint along the vertical dimension of the gas envelope, whereby the central portion of the diaphragm is substantially fixed to a predetermined position, thereby suppressing the sloshing phenomenon. Thus, even if the change in the shape of the diaphragm occurred, such a change would be symmetric or generally symmetric about the central portion of the diaphragm in a well-balanced manner. As a result, an asymmetric distribution of the buoyant gas in the buoyant gas compartment never occurs, thereby ensuring a good balance of the buoyancy from the buoyant gas. Therefore, it is possible to substantially and smoothly vary the ratio between the volume of the buoyant gas in the buoyant gas compartment and the volume of air in the air compartment so as to allow the airship to stably ascend into the stratosphere and keep a station therein.

According to a second aspect of the present invention, in the stratospheric airship according to the first aspect, the diaphragm supporting member is a suspension chord extending along a vertical direction in the gas envelope, with an upper end of the suspension chord being coupled to a central portion of an upper surface of the ship hull and with a lower end of the suspension chord being coupled to a central portion of a lower surface of the ship hull, and further the central portion of the diaphragm is coupled to the suspension chord generally at a midpoint along a vertical dimension of the suspension chord.

In the second aspect of the present invention, the diaphragm supporting member for supporting the central portion of the diaphragm can be easily provided as a suspension chord which extends in the vertical direction in the gas envelope and whose upper and lower ends are coupled to the central portions of the upper and lower surfaces of the ship hull, respectively.

According to a third aspect of the present invention, in the stratospheric airship according to the second aspect, the suspension chord passes through a center line, the center line running in a horizontal direction of the gas envelope.

In the third aspect of the present invention, the suspension chord is provided to pass through the center line of the gas envelope, thereby suppressing the sloshing phenomenon. Thus, the change in the shape of the diaphragm, even if it occurred, would be left-right symmetric or generally left-right symmetric about the central portion in a well-balanced manner, thereby more reliably ensuring a good balance of the buoyancy from the buoyant gas. Thus, it is possible to vary more smoothly the volume ratio between the buoyant gas and the air, thereby ensuring a stable ascent operation.

According to a fourth aspect of the present invention, in the stratospheric airship according to the third aspect, a plurality of the suspension chords are provided to be parallel to one another and perpendicular to the center line.

In the fourth aspect of the present invention, even if the shape of the diaphragm changes along with the change in the volume ratio between the air contained in the air compartment and the buoyant gas contained in the buoyant gas compartment, a central portion of the diaphragm is coupled to a series of suspension chords which are provided to be parallel to one another and perpendicular to the center line, whereby the central portion of the diaphragm is fixed at a plurality of positions along the center line, thereby more effectively suppressing the sloshing phenomenon. Thus, even if the change in the shape of the diaphragm occurred, such a change would be left-right symmetric or generally left-right symmetric about the central portion of the diaphragm. As a result, the left-right balance of the buoyancy from the buoyant gas is more reliably ensured. Therefore, even with a relatively large gas envelope, it is possible to smoothly vary the volume ratio between the buoyant gas in the buoyant gas compartment and the air in the air compartment, thereby achieving a stable ascent operation.

According to a fifth aspect of the present invention, in the stratospheric airship according to the second aspect, a load supporting member provided under a bottom surface of the ship hull is suspended from the lower end of the suspension chord.

In the fifth aspect of the present invention, the load supporting member carrying the load is suspended from the lower end of the suspension chord which is coupled at its upper end to a central portion of the upper surface of the ship hull, passes through the gas envelope, and is coupled at its lower end to a central portion of the bottom surface of the ship hull. Thus, the load weight of the load supporting member and the load directly acts upon the central portion of the upper surface of the ship hull via the suspension chord. As a result, the load weight of the load supporting member and the load acts downwardly via the suspension chord upon a central portion of the upper surface of the buoyant gas compartment upon which the buoyancy from the buoyant gas acts, thereby suppressing the deformation of the upper surface of the ship hull due to the buoyancy. Thus, the shape of the buoyant gas compartment is maintained, thereby suppressing the asymmetric distribution of the buoyant gas therein, and thus ensuring a good balance of the buoyancy. Moreover, the shape of the gas envelope is maintained, thereby providing an aerodynamic stability to the airship.

According to a sixth aspect of the present invention, in the stratospheric airship according to the fifth aspect, the load supporting member and a load carried by the load supporting member are enclosed in a thin film fairing, which is coupled along a periphery of the thin film fairing to the bottom surface of the ship hull, and further provides a function of layering airstream, and a tension of the thin film fairing restricts a sloshing of the load supporting member and the load.

In the sixth aspect of the present invention, the sloshing of the load supporting member and the load is restricted by the tension of the thin film fairing which also provides a function of layering the stream, the suspended load supporting member, the load, etc., are held in a stable manner, and it is possible to eliminate separate means for restricting the sloshing, thereby simplifying the structure and reducing the total weight of the structure.

According to a seventh aspect of the present invention, in the stratospheric airship according to the second aspect, a power cable is provided coaxially with or in parallel to the suspension chord.

In the seventh aspect of the present invention, the power cable is provided to pass through the gas envelope, thereby shortening the power cable and reducing the possible power loss therealong and the total weight of the airship as compared to the case of the conventional airship where the power cable is provided along the outer surface of the ship hull. Moreover, the power cable is not exposed on the outside, thereby reducing the air drag.

According to an eighth aspect of the present invention, in the stratospheric airship according to the seventh aspect, the power cable connects a solar battery module provided on the upper surface of the ship hull to a load provided under the lower surface of the ship hull.

In the eighth aspect of the present invention, the power cable for connecting the solar battery module to the load carried by the load supporting member, e.g., a storage battery, is provided coaxially with or in parallel to the suspension chord which passes through the gas envelope and connects a central portion of the upper surface of the ship hull 11 to a central portion of the lower surface of the ship hull 11. Thus, the power cable is provided via the shortest route, thereby shortening the power cables and reducing the possible power loss therealong and the total weight of the airship as compared to the case of the conventional airship where the power cable is provided along the outer surface of the gas envelope. Moreover, the power cable is not exposed on the outside, thereby reducing the air drag.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

An embodiment of a stratospheric airship according to the present invention will now be described with reference to the accompanying drawings.

Figure 1:
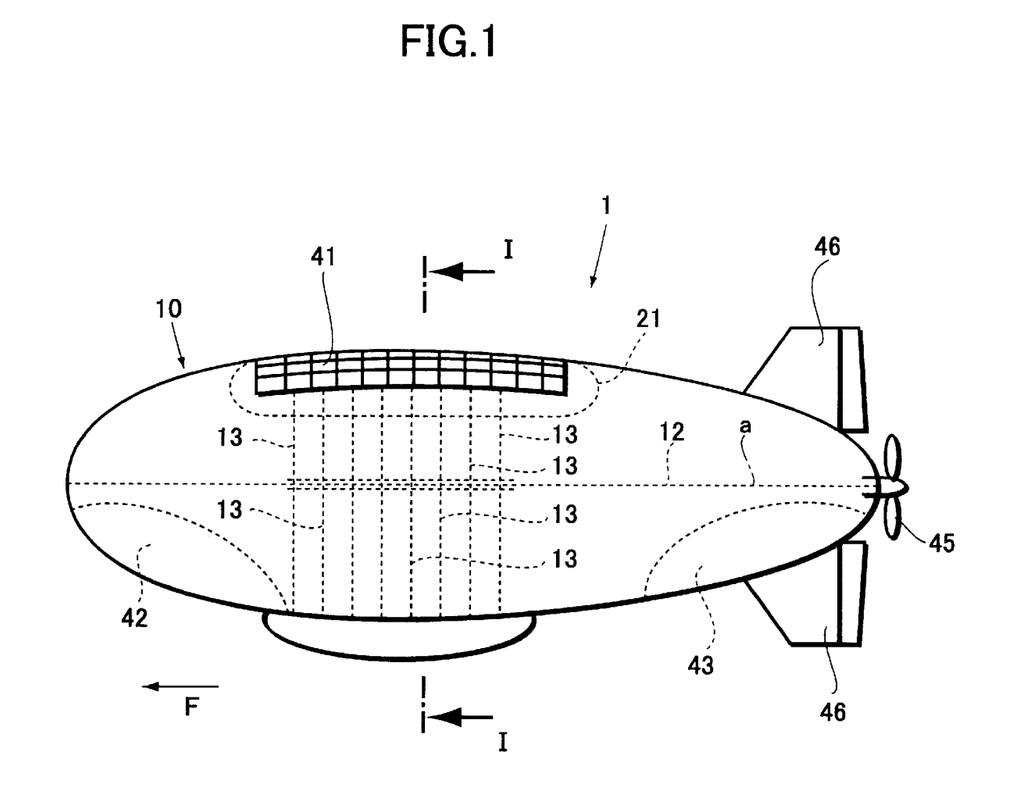
FIG. 1 is a side view schematically illustrating an embodiment of a stratospheric airship according to the present invention.
Figure 2:
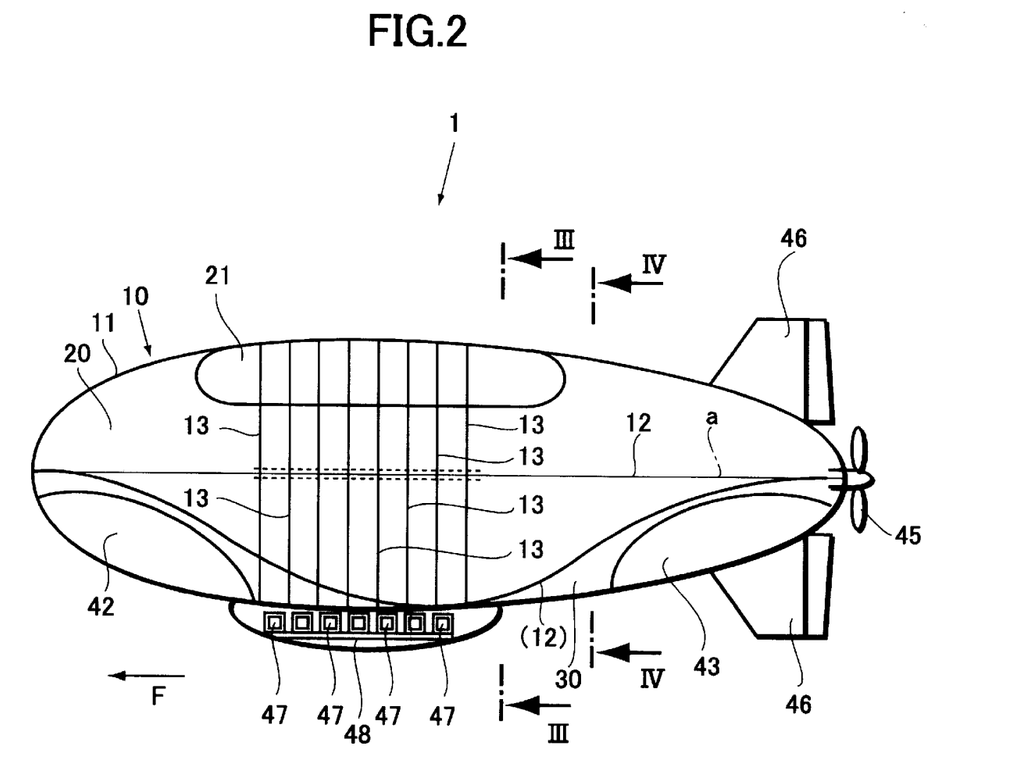
FIG. 2 is a vertical cross-sectional view of FIG. 1.
Figure 3:
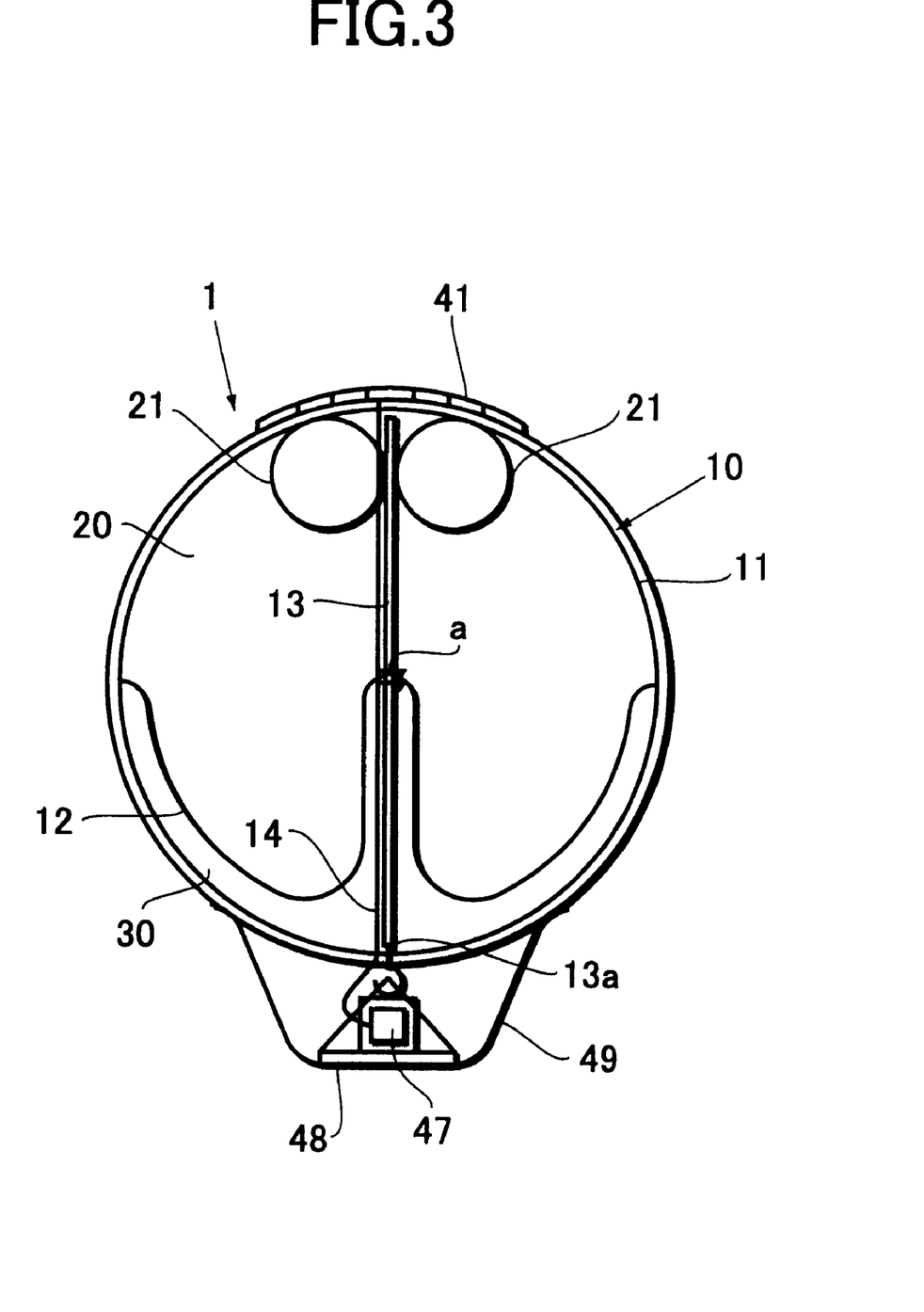
FIG. 3 is a cross-sectional view taken along line I—I in FIG. 1.

FIG. 1 is a side view illustrating a stratospheric airship 1. FIG. 2 is a cross-sectional view illustrating the stratospheric airship 1 of FIG. 1 taken along the lateral direction. FIG. 3 is a cross-sectional view illustrating the stratospheric airship 1 taken along line I—I in FIG. 1. An arrow F denotes the forward direction of the airship 1.

The stratospheric airship 1 has a gas envelope 10 which has a generally circular cross section and a generally elliptical shape as viewed in a side view, for example. Various instruments and parts are secured to the gas envelope 10.

The gas envelope 10 is a generally ellipsoidal balloon defined by a ship hull 11. A solar battery module 41 is attached to the upper surface of the ship hull 11 via an adhesive thermal insulator layer. Ballonets 42 and 43 are respectively provided in a front and a rear portion within the ship hull 11.

Each of the ballonets 42 and 43 is a small gas envelope filled with air. At low altitudes, air is introduced thereinto so as to maintain the pressure in the gas envelope 10. As the airship 1 ascends to a higher altitude, air is discharged to accommodate the difference between the atmospheric pressure (which decreases along with an increase in altitude) and the internal pressure of the gas envelope 10 so as to maintain the outer shape of the gas envelope 10, i.e., the shape of the airship 1, while the volume of air in the front and rear ballonets 42 and 43 is adjusted to keep the balance of the airship 1.

A propulsion unit 45, a stabilizer 46, etc., are provided in the rear of the airship 1. A load supporting member 48 is provided under the bottom surface of the ship hull 11 for carrying a load 47 including equipment, a storage battery, a fuel cell, mission payload equipment, etc.

The gas envelope 10 is vertically divided by a diaphragm 12, which is a flexible diaphragm, into a buoyant gas compartment 20 containing a buoyant gas and an air compartment 30 containing air. The diaphragm 12 is air-tightly coupled along its entire periphery to the ship hull 11 generally at the midpoint along the vertical dimension of the gas envelope 10. An intermediate portion of the diaphragm 12 is coupled to diaphragm supporting members so that the diaphragm 12 is supported generally at the midpoint along the vertical dimension of the gas envelope 10. The diaphragm supporting members are provided as a plurality of suspension chords 13 which extend generally in the vertical direction of the gas envelope 10 passing through the center line "a" (the center line "a" generally corresponds to the central axis of the gas envelope 10) which runs along the horizontal direction of the gas envelope 10. The suspension chords 13 are provided to be parallel to one another and perpendicular to the center line "a", and to connect a center portion of the upper surface of the ship hull 11 and a center portion of the bottom surface of the ship hull 11. The suspension chords 13 are coupled to the diaphragm 12 generally at their longitudinal midpoints.

Figure 4:
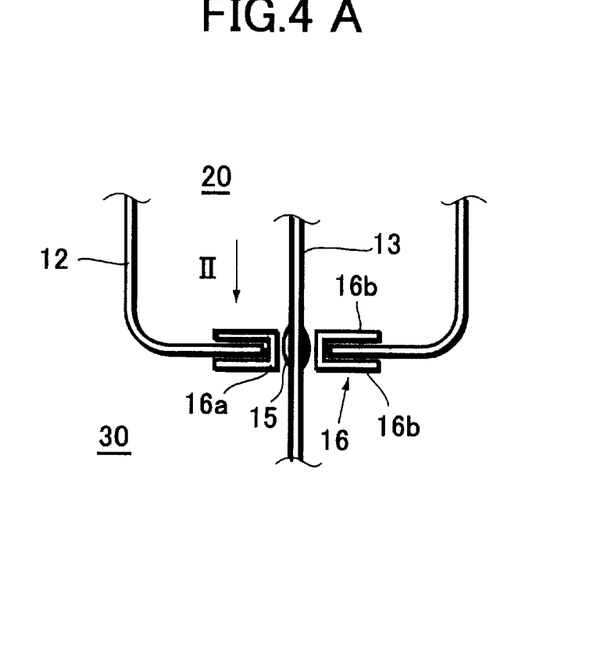
FIG. 4A is a vertical cross-sectional view illustrating the coupling between a diaphragm and a suspension chord.
FIG. 4B illustrates the coupling as viewed from the direction indicated by an arrow II in FIG. 4A.

FIG. 4A is a vertical cross-sectional view illustrating the coupling between the diaphragm 12 and the suspension chord 13. FIG. 4B illustrates the coupling as viewed from the direction indicated by an arrow II in FIG. 4A. A tubular sealing 15 which is made of a soft rubber, or the like, is fitted around the suspension chord 13, and the diaphragm 12 and the suspension chord 13 are coupled to each other by a retainer ring 16 while ensuring the air-tightness between the buoyant gas compartment 20 and the air compartment 30. The retainer ring 16 includes a central tubular coupling 16a which is fitted around the sealing member 15, and a pair of grommets 16b for vertically sandwiching a peripheral portion of a through hole 12a provided in the diaphragm 12.

The shape of the diaphragm 12 unfolded is close to the shape of the upper or lower half of the ship hull 11. Preferably, the shape of the diaphragm 12 is slightly smaller than the upper or lower half of the ship hull 11 so as to avoid an interference with the ballonets 42 and 43 provided in the air compartment 30 or a thin film buoyant gas tank 21 provided in an upper portion of the buoyant gas compartment 20.

The thin film buoyant gas tank 21 is designed to have a volume equal to about 1/14 of the total volume of the gas envelope 10, i.e., the total value of the volume of the buoyant gas in the buoyant gas compartment 20 and the thin film buoyant gas tank 21 and the volume of air in the air compartment 30.

Moreover, the load supporting member 48 (which is provided under the bottom surface of the gas envelope 10 for carrying the load 47 including equipment, a storage battery, a fuel cell, mission payload equipment, etc.) is suspended at its upper end from a lower end 13a of the suspension chord 13 which is coupled to a center portion of the bottom surface of the ship hull 11. The load supporting member 48, the load 47, etc., are enclosed in a thin film fairing 49. The thin film fairing 49 is coupled along its periphery to the bottom surface of the ship hull 11, and the thin film fairing 49 also provides a function of layering the stream. The tension of the thin film fairing 49 restricts the sloshing of the load supporting member 48.

Since the tension of the thin film fairing 49 restricts the sloshing of the load supporting member 48, the load 47, etc., the suspended load supporting member 48, the load 47, etc., are held in a stable manner, and it is possible to eliminate or simplify separate means for restricting the sloshing, thereby simplifying the structure and reducing the total weight of the structure.

Power cables 14 are provided coaxially with or in parallel to the suspension chords 13 for connecting the solar battery module 41 to the load 47, e.g., the storage battery, carried by the load supporting member 48. In the present embodiment, the power cables 14 are provided coaxially with the suspension chords 13.

Figure 5:
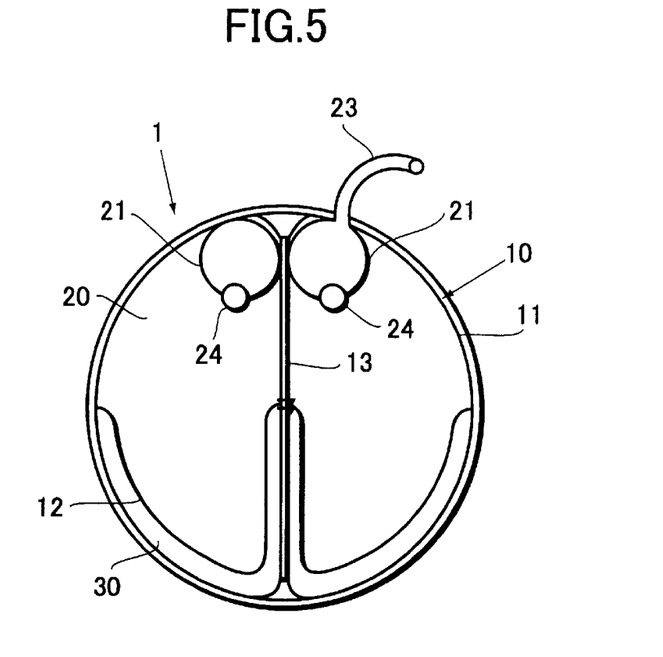
FIG. 5 is a cross-sectional view taken along line III—III in FIG. 2.

FIG. 5 is a cross-sectional view taken along line III—III in FIG. 2. Referring to FIG. 5, a buoyant gas inlet 23 is provided in an upper portion of the ship hull 11 for introducing a buoyant gas into the thin film buoyant gas tank 21. The buoyant gas inlet 23 is provided with a valve (not shown). The thin film buoyant gas tank 21 is provided with a buoyant gas vent valve 24 for discharging the buoyant gas into the buoyant gas compartment 20.

Figure 6:
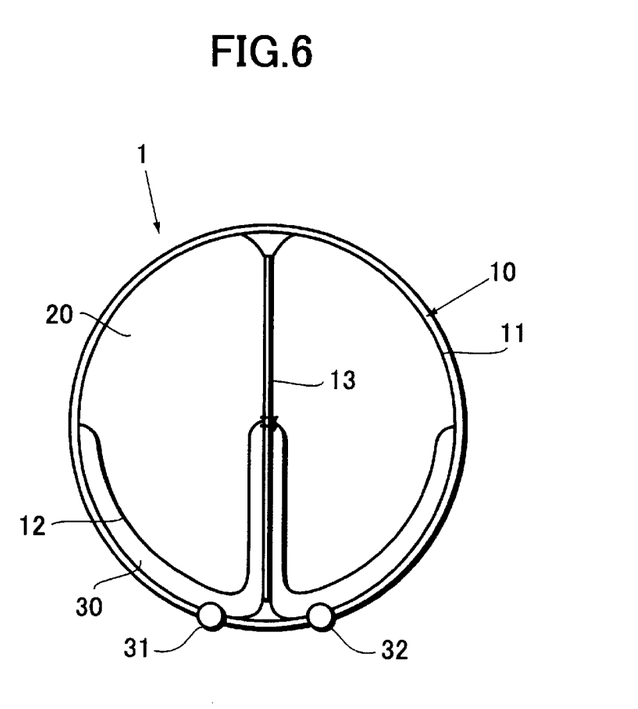
FIG. 6 is a cross-sectional view taken along line IV—IV in FIG. 2.

FIG. 6 is a cross-sectional view taken along line IV—IV in FIG. 2. Referring to FIG. 6, an air blower 31 for introducing the atmosphere into the air compartment 30 so as to pressurize the air compartment 30 and an air vent valve 32 for discharging the air from the air compartment 30 are provided in a bottom portion of the ship hull 11.

Next, the operation of the stratospheric airship 1 having such a structure will be described with reference to FIG. 7A to FIG. 7D and FIG. 8 illustrating the inside of the gas envelope 10 of the stratospheric airship 1 in operation.

Figure 7:
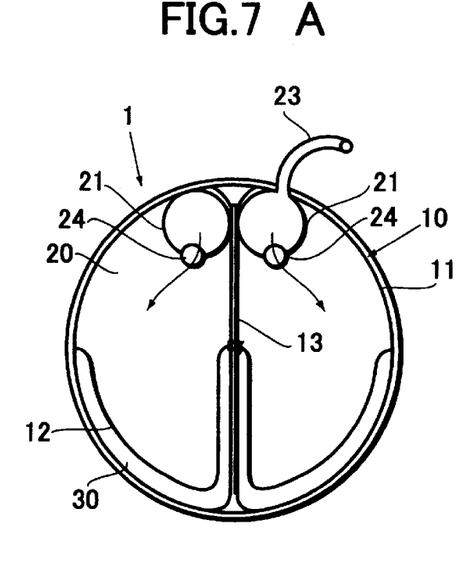
FIG. 7A and FIG. 7B each illustrate the inside of a gas envelope of the airship while the airship is still on the ground.
FIG. 7C illustrates the inside of the gas envelope of the airship while the airship is ascending/descending.
FIG. 7D illustrates the inside of the gas envelope of the airship while the airship is keeping a station in the stratosphere.

FIG. 7A to FIG. 7D each illustrate the inside of the gas envelope 10 of the airship 1 in operation. FIG. 7A and FIG. 7B each illustrate the inside of the gas envelope 10 of the airship 1 while the airship 1 is still on the ground, FIG. 7C illustrates the inside of the gas envelope 10 of the airship 1 while the airship 1 is ascending or descending, and FIG. 7D illustrates the inside of the gas envelope 10 of the airship 1 while the airship 1 is keeping a station in the stratosphere.

Each of FIG. 7A and FIG. 7C is a cross-sectional view taken along line III—III in FIG. 2, and each of FIG. 7B and FIG. 7D is a cross-sectional view taken along line IV—IV in FIG. 2.

Referring to FIG. 7A, while the airship 1 is still on the ground before takeoff, a buoyant gas, e.g., a helium gas, is introduced via the buoyant gas inlet 23 into the thin film buoyant gas tank 21, and the buoyant gas is further supplied from the thin film buoyant gas tank 21 into the buoyant gas compartment 20 via the buoyant gas vent valve 24.

Then, the valve of the buoyant gas inlet 23 and the air vent valve 32 are closed, and the atmosphere is introduced via the air blower 31 into the air compartment 30 so as to pressurize the air compartment 30 to a pressure which is about 500 to 1000 Pa higher than the ambient pressure, thereby maintaining the shape of the a gas envelope 10. In this state, as illustrated in FIG. 7B, the diaphragm 12 is pushed up by the pressurized air in the air compartment 30, thereby pressurizing the buoyant gas in the buoyant gas compartment 20 and the thin film buoyant gas tank 21 to a pressure in equilibrium with the pressure of the air in the air compartment 30, e.g., about 500 to 1000 Pa. Then, the buoyant gas vent valve 24 which communicates the buoyant gas compartment 20 and the thin film buoyant gas tank 21 with each other is closed to complete the preparation for takeoff.

The airship 1 starts ascending by an excessive buoyancy which is equal to the buoyancy provided by the buoyant gas in the buoyant gas compartment 20 and the thin film buoyant gas tank 21 minus the total weight of the airship 1 including the equipment. As the airship 1 ascends, the atmospheric pressure gradually decreases. Along with the decrease in the atmospheric pressure, the difference between the internal pressure of the gas envelope 10 and the atmospheric pressure gradually increases. This pressure difference creates a tension on the ship hull 11.

If the tension on the ship hull 11 becomes excessive, it may break the ship hull 11. Therefore, the air vent valve 32 is opened to discharge the air in the air compartment 30 and reduce the volume of air therein, thereby depressurizing the gas envelope 10 so as to maintain the pressure difference to be less than a predetermined limit pressure difference in view of a safety margin.

The buoyant gas in the buoyant gas compartment 20 starts expanding according to the difference between the pressure of the buoyant gas in the buoyant gas compartment 20 and the pressure of the air in the air compartment 30 which occurs along with the decrease in the volume of air in the air compartment 30. The pressure of the buoyant gas in the buoyant gas compartment 20 starts decreasing by the expansion of the buoyant gas, thereby beginning to create a pressure difference between the buoyant gas in the buoyant gas compartment 20 and the buoyant gas in the thin film buoyant gas tank 21. This pressure difference creates a tension on the film of the thin film buoyant gas tank 21. The tension may break the film of the thin film buoyant gas tank 21. Therefore, when the pressure difference reaches a predetermined limit pressure difference, the buoyant gas vent valve 24 is opened to transfer the buoyant gas in the thin film buoyant gas tank 21 to the buoyant gas compartment 20 in order to prevent the possible break of the film of the thin film buoyant gas tank 21.

The buoyant gas transferred into the buoyant gas compartment expands to compensate for the reduction in the volume of air in the gas envelope 10 due to the discharge of air, thereby pushing down the diaphragm 12 as illustrated in FIG. 7C. Thus, the volume of the gas envelope 10 is constantly maintained, while the pressure of the gas envelope 10 is reduced to keep the pressure difference between the gas envelope 10 and the atmosphere at or below the limit pressure difference.

As the airship 1 further ascends, the discharge of air from the air compartment 30 and the transfer of the buoyant gas from the thin film buoyant gas tank 21 into the buoyant gas compartment 20 are successively repeated. Thus, the volume of air in the air compartment 30 is gradually reduced, and the buoyant gas in the buoyant gas compartment 20 expands to compensate for the reduction in the volume of air, thereby gradually pushing down the diaphragm 12 to constantly maintain the volume of the gas envelope 10 and to reduce the pressure of the gas envelope 10 to keep the pressure difference between the gas envelope 10 and the atmosphere at or below the limit pressure difference. Thus, a state as illustrated in FIG. 7D is reached, in which the airship 1 ascends to the stratosphere, e.g., 17 Km to 22 Km in altitude.

Even though the shape of the diaphragm 12 changes along with the reduction in the volume of air in the air compartment 30 and the expansion of the buoyant gas in the buoyant gas compartment 20, a central portion of the diaphragm 12 is coupled to the plurality of suspension chords 13 successively arranged along the horizontal direction of the airship 1, whereby the central portion of the diaphragm 12 is substantially fixed to a predetermined position, thereby suppressing the sloshing phenomenon. Thus, even if the change in the shape of the diaphragm 12 occurred, such a change would be left-right symmetric or generally left-right symmetric about the central portion of the diaphragm 12 in a well-balanced manner.

As a result, an asymmetric distribution of the buoyant gas in the buoyant gas compartment 20 never occurs, thereby ensuring a good balance of the buoyancy from the buoyant gas and which acts upon the gas envelope 10. Therefore, it is possible to substantially and smoothly vary the ratio between the volume of the buoyant gas in the buoyant gas compartment 20 and the volume of air in the air compartment 30 so as to allow the airship 1 to stably ascend into the stratosphere and keep a station therein. Moreover, it is possible to increase the size of the gas envelope 10, and thus the size of the entire airship 1.

Figure 8:
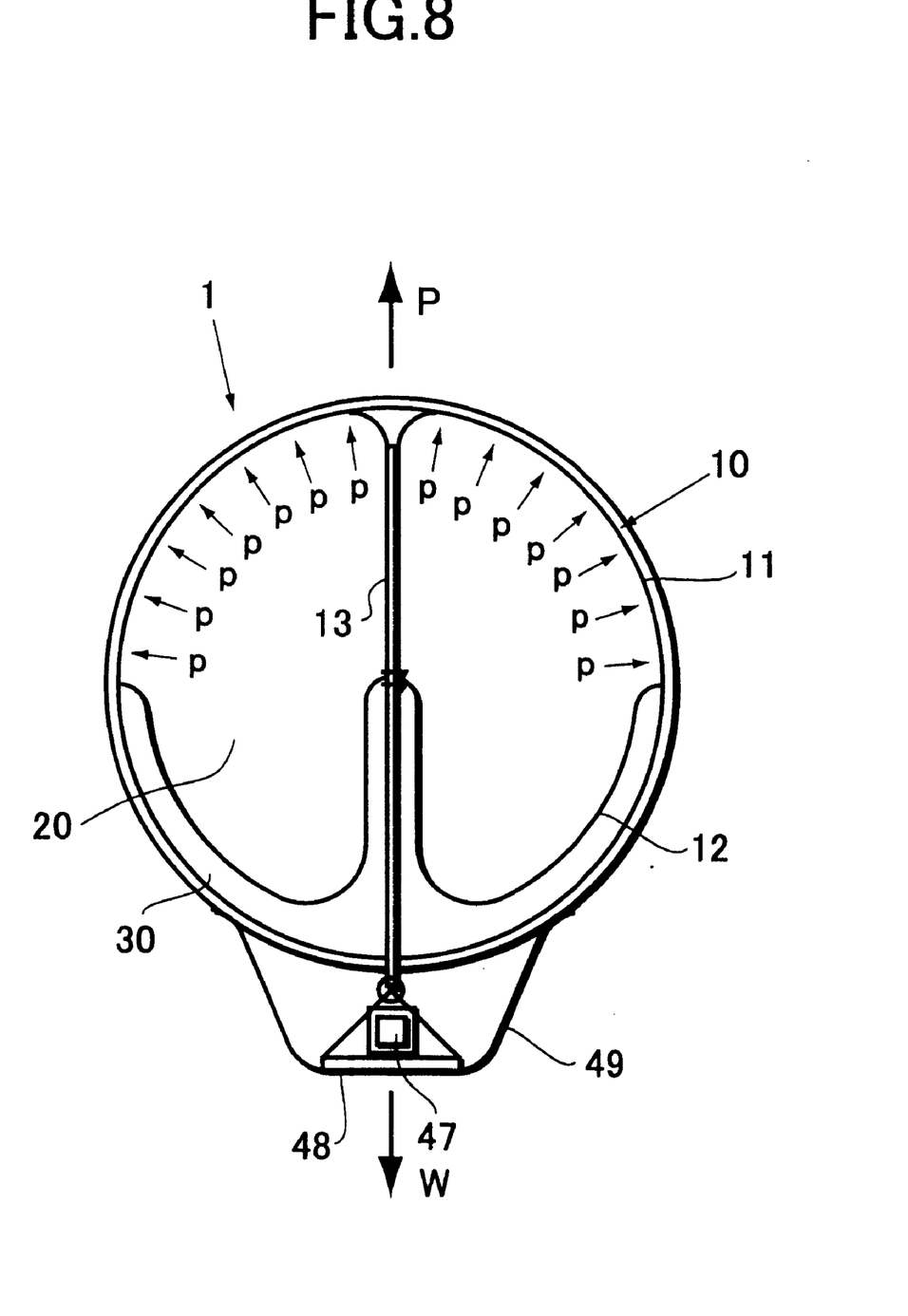
FIG. 8 is a cross-sectional view illustrating the action of the load weight.

Furthermore, the load supporting member 48 carrying the load 47 (including equipment, a storage battery, a fuel cell, mission payload equipment, etc.), etc., is suspended from the lower end of the suspension chords 13 which are coupled at their upper ends to a central portion of the upper surface of the ship hull 11, pass through the central portion of the gas envelope 10, and are coupled at their lower ends to a central portion of the bottom surface of the ship hull 11. Thus, as illustrated in FIG. 8, the load weight W of the load supporting member 48 and the load 47 directly acts upon the central portion of the upper surface of the ship hull 11 via the suspension chords 13.

Specifically, the load weight W of the load supporting member 48 and the load 47 acts downwardly via the suspension chords 13 upon a central portion of the upper surface of the ship hull 11 (which is the center of the area of the ship hull 11 upon which the buoyancy p of the buoyant gas acts), thereby suppressing the deformation of the buoyant gas compartment 20 due to the buoyancy p. Thus, the shape of the upper surface of the buoyant gas compartment 20 is maintained, thereby suppressing the asymmetric distribution of the buoyant gas therein, and thus ensuring a good balance of the buoyancy acting upon the gas envelope 10. Note that, an arrow P denotes the total of the buoyancy components p. Moreover, the deformation of the shape of the upper surface of the ship hull 11 is suppressed, and thus the shape of the gas envelope 10 is maintained, thereby providing an aerodynamic stability to the airship 1.

Moreover, the power cables 14 connecting the solar battery module 41 to the storage battery, etc., carried by the load supporting member 48 are provided coaxially with or in parallel to the suspension chords 13 which pass through the gas envelope 10 connecting a central portion of the upper surface of the ship hull 11 to a central portion of the lower surface of the ship hull 11. Thus, the power cable is provided via the shortest route, thereby shortening the power cables 14 and reducing the possible power loss therealong and the total weight of the airship as compared to the case of the conventional airship where the power cables 14 are provided along the outer surface of the gas envelope. Moreover, the power cables 14 are not exposed on the outside, thereby reducing the air drag.

Note that the stratospheric airship of the present invention is not limited to the particular embodiment described above, and various modifications may be made thereto without departing from the spirit and scope of the invention. For example, while a plurality of suspension chords are provided in the embodiment described above, a single suspension chord may be sufficient for a relatively small airship. Moreover, while the diaphragm is coupled to the suspension chords generally at the longitudinal midpoints of the suspension chords in the embodiment described above, the suspension chord and the diaphragm may be coupled to each other with the diaphragm coupling point along the suspension chords being shifted up or down depending upon the shape and/or size of the ballonet, the thin film buoyant gas tank, etc.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A stratospheric airship, comprising:

a gas envelope defined by a ship hull;

a flexible diaphragm for vertically dividing said gas envelope into a buoyant gas compartment containing a buoyant gas and an air compartment containing air, said diaphragm being coupled along a periphery of said diaphragm to said ship hull generally at a midpoint along a vertical dimension of said ship hull; and a diaphragm supporting member for coupling a central portion of said diaphragm to a central portion of said gas envelope generally at a midpoint along a vertical dimension of said gas envelope, wherein said stratospheric airship can be ascended by varying a volume ratio between said buoyant gas contained in said buoyant gas compartment and said air contained in said air compartment.

2. The stratospheric airship according to claim 1, wherein said diaphragm supporting member is a suspension chord extending along a vertical direction in said gas envelope, with an upper end of said suspension chord being coupled to a central portion of an upper surface of said ship hull and with a lower end of said suspension chord being coupled to a central portion of a lower surface of said ship hull, said central portion of said diaphragm being coupled to said suspension chord generally at a midpoint along a vertical dimension of said suspension chord.

3. The stratospheric airship according to claim 2, wherein said suspension chord passes through a center line, said center line running in a horizontal direction of said gas envelope.

4. The stratospheric airship according to claim 3, wherein a plurality of said suspension chords are provided to be parallel to one another and perpendicular to said center line.

5. The stratospheric airship according to claim 2, wherein a load supporting member provided under a bottom surface of said ship hull is suspended from said lower end of said suspension chord.

6. The stratospheric airship according to claim 5, wherein said load supporting member and a load carried by said load supporting member are enclosed in a thin film fairing, said thin film fairing being coupled along a periphery of said thin film fairing to said bottom surface of said ship hull, said thin film fairing providing a function of layering the airstream, and a tension of said thin film fairing restricting a sloshing of said load supporting member and said load.

7. The stratospheric airship according to claim 2, wherein a power cable is further provided coaxially with or in parallel to said suspension chord.

8. The stratospheric airship according to claim 7, wherein said power cable is for connecting a solar battery module provided on said upper surface of said ship hull to a load provided under said lower surface of said ship hull.

\* \* \* \* \*

UNITED STATES PATENT AND TRADEMARK OFFICE
CERTIFICATE OF CORRECTION

PATENT NO.     : 6,427,943 B2
DATED          : August 6, 2002
INVENTOR(S)    : Yokomaku et al.

It is certified that error appears in the above-identified patent and that said Letters Patent is hereby corrected as shown below:

<u>Title page,</u>
Item [73], change "Assignee: Fuji Jukogyo Kabushiki Kaisha, Tokyo (JP)" to
-- Assignees: Fuji Jukogyo Kabushiki Kaisha, Tokyo (JP); National Aerospace Laboratory, Tokyo (JP) --

Signed and Sealed this

Eleventh Day of May, 2004

JON W. DUDAS
*Acting Director of the United States Patent and Trademark Office*